No. 852,320. PATENTED APR. 30, 1907.
T. A. DICKS.
TOOL CHUCK.
APPLICATION FILED JUNE 13, 1906.
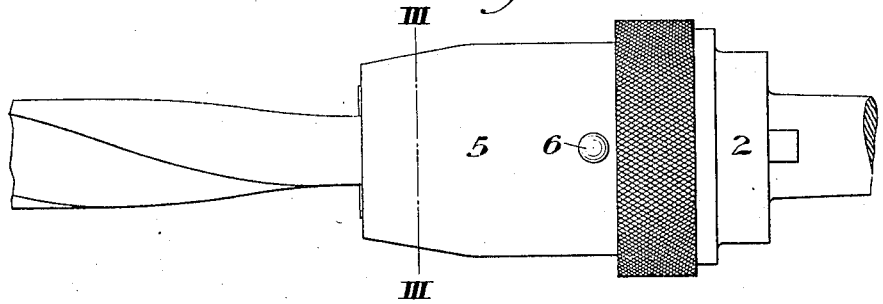
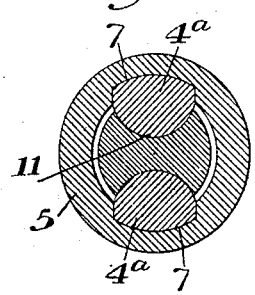
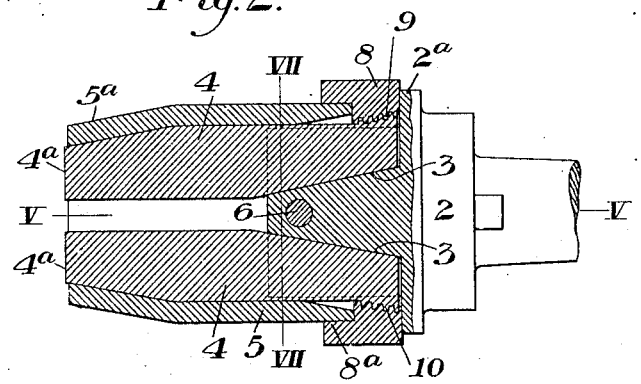
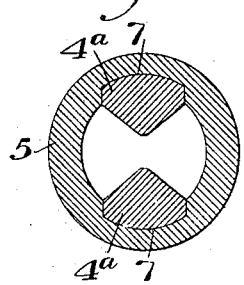
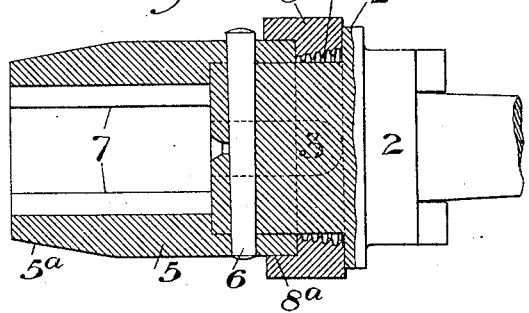
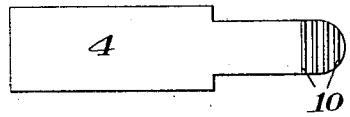
WITNESSES
INVENTOR

UNITED STATES PATENT OFFICE.

THOMAS A. DICKS, OF WILKINSBURG, PENNSYLVANIA, ASSIGNOR OF ONE-HALF TO WILLIAM HENRY MACK, OF WILKINSBURG, PENNSYLVANIA.

TOOL-CHUCK.

No. 852,320.  Specification of Letters Patent.  Patented April 30, 1907.

Application filed June 13, 1906. Serial No. 321,502.

*To all whom it may concern:*

Be it known that I, THOMAS A. DICKS, of Wilkinsburg, Allegheny county, Pennsylvania, have invented a new and useful Improvement in Tool-Chucks, of which the following is a full, clear, and exact description, reference being had to the accompanying drawings, forming part of this specification, in which—

Figure 1 is a side view of a chuck embodying my invention; Fig. 2 is a central longitudinal section of the same; Fig. 3 is a section on the line III—III of Fig. 1; Fig. 4 is a similar section showing a modification; Fig. 5 is a section on the line V—V of Fig. 2 with the jaws removed; Fig. 6 is a plan view of one of the chuck jaws; Fig. 7 is a partial section on the line VII—VII of Fig. 2.

My invention is designed to provide a tool chuck which is particularly designed for use with heavy and high speed tools, the object of my invention being to provide a chuck which is simple and positive in its action, which can be readily adjusted to receive and release the tool, and in which the gripping jaws are so seated and guided as to be largely relieved from the strain of the tool, thereby reducing to a minimum the danger of breakage in high speed and heavy work.

Other objects and advantages of my invention will hereinafter appear.

In the accompanying drawings, the numeral 2 designates the head of the chuck, which is formed with the slots or recesses 3 to receive the inner end portions of the sliding jaws 4.

5 is a fixed cap or shell which is rigidly secured to the head 2 by means of a bolt or pin 6, or in any other suitable manner. The end portion 5ª of the cap or shell is tapered to a smaller diameter and is formed with recesses or grooves 7 to receive and guide the end portions 4ª of the jaws 4. The bottoms of the recesses 3, and the bottoms of the recesses 7 have beveled parallel surfaces upon which the jaws move, being actuated by the adjusting ring 8 which is seated between the inner end of the shell 5 with a flange 8ª embracing the end of the shell, and a shoulder 2ª of the head 2. The inner face of this ring is formed with a thread 9 to engage the segmental threads 10 on the ends of the jaws 4. By rotating the ring 8, the jaws 4 are advanced or retracted to clamp and release the shank of the tool.

The clamping face of the jaws 4 may be of any desired form such as the well known V-form shown in Fig. 4. I prefer, however, to make them of the convex form shown at 11 in Fig. 3, to fit a corresponding concavity in the shank of the tool. This convex form is preferred for the reason that it is much easier to shape accurately, as is also the concave shape of the corresponding depression in the tool shank. It is also better for high speed and heavy tools, as it is stronger, there being no thin edges to give a starting point for fractures such as exist in the V-form.

It will be noted that by means of the construction described, an opening for the tool is provided in the chuck of the full inner diameter of the shell 5, thereby admitting the use of a larger and stronger shank on the tools. By partially seating the jaws within the recesses 7 of the shell 5, these jaws are securely supported by the walls of such grooves, and are thereby relieved of the twisting and wrenching strains imparted to them by the tools.

A further advantage of the construction consists in the fact that the jaws are actuated and guided in such a manner as to cause them to at all times properly center the tool.

Various changes may be made in the details of construction and arrangement of the parts by those skilled in the art without departing from the spirit and scope of my invention, since

What I claim is:—

1. A tool chuck having a head, a shell fixed to said head and extending forwardly beyond the same, and longitudinally-movable clamping jaws seated at one end portion in guides or grooves of the head, and at the opposite end portion in guides or grooves of the shell; substantially as described.

2. A tool chuck having a longitudinally-movable jaw and a fixed surrounding shell having a groove which receives and guides the outer edge portion of the jaw, together with means for actuating the jaw; substantially as described.

3. A tool chuck having jaws fitting at their outer edges in grooves of the chuck shell, and having their inner faces shaped to fit into grooves of a tool shank, whereby both the inner and outer edges of the jaws are supported against torsional strains; substantially as described.

In testimony whereof, I have hereunto set my hand.

THOMAS A. DICKS.

Witnesses:
H. M. CORWIN,
GEO. H. PARMELEE.